United States Patent
Lowell

[11] Patent Number: 5,346,537
[45] Date of Patent: Sep. 13, 1994

[54] METHOD AND SYSTEM FOR CONTROLLING EMISSIONS FROM GLYCOL DEHYDRATORS

[75] Inventor: Philip S. Lowell, Austin, Tex.

[73] Assignee: Gas Research Institute, Chicago, Ill.

[21] Appl. No.: 59,490

[22] Filed: May 10, 1993

Related U.S. Application Data

[63] Continuation-in-part of Ser. No. 825,540, Jan. 24, 1992, Pat. No. 5,209,762.

[51] Int. Cl.$^5$ .................................................... B01D 53/14
[52] U.S. Cl. ................................................ 95/161; 95/163; 95/166; 95/173; 95/177; 95/184; 95/191; 95/231; 96/185; 96/201
[58] Field of Search .................. 95/159-163, 95/165, 166, 168, 169, 173, 177, 184, 191, 194, 231; 96/184, 185, 201, 202; 55/222, 228

[56] References Cited

U.S. PATENT DOCUMENTS

| | | | |
|---|---|---|---|
| 1,818,158 | 8/1931 | Pier et al. | 585/867 X |
| 2,945,073 | 7/1960 | Barnes et al. | 585/338 |
| 3,182,434 | 5/1965 | Fryar | 55/32 |
| 3,213,593 | 10/1965 | Hendrix | 585/15 X |
| 3,471,370 | 10/1969 | Jubin, Jr. | 203/49 |
| 3,589,104 | 6/1971 | Panzarella | 55/32 |
| 3,616,598 | 11/1971 | Foral, Jr. | 55/32 |
| 3,651,617 | 3/1972 | Hodgson | 55/228 X |
| 3,736,725 | 6/1973 | Alleman et al. | 55/32 |
| 3,766,714 | 11/1973 | Cunningham et al. | 55/48 |
| 3,837,143 | 9/1974 | Sutherland et al. | 55/32 |
| 3,844,736 | 10/1974 | Kruis et al. | 55/32 |
| 3,918,934 | 11/1975 | Kriebel et al. | 55/48 |
| 4,009,083 | 2/1977 | Lyon et al. | 203/49 |
| 4,070,231 | 1/1978 | Alleman | 55/32 X |
| 4,182,659 | 1/1980 | Anwer et al. | 203/18 |
| 4,189,309 | 2/1980 | Hoekstra | 95/162 |
| 4,193,776 | 3/1980 | Wasala et al. | 55/49 |
| 4,273,620 | 6/1981 | Knobel | 95/191 X |
| 4,280,867 | 7/1981 | Hodgson | 95/191 X |
| 4,314,891 | 2/1982 | Knobel | 203/18 |
| 4,670,027 | 6/1987 | Becker et al. | 55/48 |
| 4,674,446 | 6/1987 | Padilla, Sr. | 95/194 X |
| 4,689,053 | 8/1987 | Heath | 55/20 |
| 4,701,188 | 10/1987 | Mims | 55/222 X |
| 4,708,721 | 11/1987 | Ehrler | 55/40 |
| 4,976,935 | 12/1990 | Lynn | 423/222 |
| 5,084,074 | 1/1992 | Beer et al. | 55/20 |
| 5,163,981 | 11/1992 | Choi | 55/32 |
| 5,167,675 | 12/1992 | Rhodes | 95/231 X |
| 5,209,762 | 5/1993 | Lowell | 95/231 X |

*Primary Examiner*—Robert Spitzer
*Attorney, Agent, or Firm*—Klauber & Jackson

[57] ABSTRACT

Method and apparatus are disclosed which are improvements in the conventional method and apparatus for extracting water from a gas stream such as a natural gas stream by contacting the stream with a glycol to absorb the water, and then regenerating the glycol for further use in extraction by heating the moist glycol in a glycol regenerator to vaporize the water contained in same as steam. The improvement enables control of emissions of volatile organic compounds which have been absorbed by the glycol during contact with the gas stream, while minimizing the contaminants in the water streams produced. The vented steam and gaseous volatile organics are flowed from the glycol regenerator as input to a cooling condenser having successive air and water-cooled condensers, to produce a condenser water stream having a relatively high content of the organic compounds. The condenser water stream is passed to a cooling tower and then through the tower in counter-current or cross-current relation to stripping air, whereby the condenser water stream is stripped of substantial parts of its organics content and emerges as a stripped water stream having low content of the organics. The stripped water stream is used to cool the water-cooled condenser.

10 Claims, 4 Drawing Sheets

METHOD AND SYSTEM FOR CONTROLLING EMISSIONS FROM GLYCOL DEHYDRATORS

RELATED APPLICATION

This application is a continuation-in-part of copending application, Ser. No. 825,540, filed Jan. 24, 1992, now U.S. Pat. No. 5,209,762.

BACKGROUND OF THE INVENTION

This invention relates generally to methods and apparatus for drying gases, especially natural gas, with a glycol; and more specifically relates to a method and apparatus of this type wherein the emissions of undesired organics which normally occurs during regeneration of the glycol are minimized.

Glycol dehydrators are commonly used to extract water from gas streams, including from produced natural gas streams to prevent problems associated with hydrate and ice formation and corrosion in the gas pipeline. Aromatic hydrocarbons are highly soluble in the triethylene glycol used in such glycol dehydrators and in the ethylene glycol used in large low temperature separation units. Therefore as the lean glycol solutions are contacted with the natural gas stream in an absorber, not only water, but various hydrocarbon species are absorbed. The water must be removed from the glycol to enable the latter's reuse in the drying of the gas. Accordingly, the water-containing (moist) glycol is conventionally heated in a so-called glycol regenerator, whereat the greater part of the water is vaporized, commonly in the form of steam and separated. A concentrated glycol having a low water content is recovered and recycled for further gas drying. This conventional type of operation is discussed in prior art patents such as U.S. Pat. Nos. 4,182,659 and 4,314,891, and is illustrated in simplified schematic fashion in the prior art system shown in FIG. 1. As seen therein the wet gas, as for example a natural gas 10 is provided to the bottom of an absorption column 12, emerges at the top of same and after passing through heat exchanger 13 is provided as a dry gas 14 for further use. During passage through the absorber 12, the gas contacts glycol 16, which is preferably triethylene glycol, in a countercurrent manner. The moist glycol emerges from the column at 18, passes through a throttle valve 20, is passed through a heat exchange loop 21 at the top of glycol regenerator 28, and provided to a flash tank 22 where it is expanded to the range of 2 to 10 atmospheres absolute. A two phase mixture forms at flash tank 22. Most of the mass will be present in the liquid phase as glycol and water. The bulk of the volume will be in the gas phase, mostly as light gases such as methane and propane. These light gases are undesired species that mainly have been absorbed in the glycol during drying. These light gases are vented at 24 as flash gas. Some of this flash gas may be vented at 23 as undesired emissions. The gas, 24, may also be used as fuel 25 to fire a reboiler 29 for regenerator 28. The glycol and small amount of water exits flash tank 22 at 27, then passes through a heat exchanger 26 where it is preheated and is then provided to the glycol regenerator 28.

The glycol regenerator 28 is heated, as for example from the gas fired reboiler 29 the flue gases from which exit at 30. The moist glycol is dried by the heat, and exits at line 31. It then passes through heat exchanger 26, is pumped back up to pressure by pump 33 and after passing through heat exchanger 13 is recycled back to absorber 12. Emissions from the heating are vented from the glycol regenerator 28 as regenerator off gas at 32. These emissions consist largely of the water which has been driven off from the glycol by the heating, which water is in the form of steam. However, there are also contained in the emissions a number of organic species, including benzene, toluene, ethyl benzene and xylenes (hereinafter collectively referred to as "BTEX"), and other volatile organic compounds ("VOCs") all of which (in the absence of control) are undesirably emitted to atmosphere.

The primary controls used to the present in order to eliminate or minimize organic emissions of the foregoing type are simple air and/or water-cooled condensers that produce a vent gas, an organic liquid, and liquid water containing organic compounds at a proportion of approximately 1400 parts per million (ppmw). This is comprised of about 350 ppm BTEX and 1050 ppm aliphatic hydrocarbons. Thus while BTEX control efficiency of these systems is high, a contaminated water is produced. This type of prior art control system is illustrated in the schematic showing of FIG. 2. Here the steam and organic emissions from glycol regenerator 28 pass via line 34 through a condenser 36 to the accumulator 38, where the emissions are separated into a water stream 40, an organic liquid 42, and vent gas 44. However, because of the nature of the emissions, the water stream 40 is highly contaminated as indicated. It may be noted that in some instance condenser 36 may include internally the functions of accumulator 38. Various thermal and catalytic incineration techniques have also been considered in the past as control techniques to eliminate the undesired organic species thus existing, but are costly to implement and not particularly effective or efficient.

In accordance with the disclosure of my aforementioned copending application, Ser. No. 825,540, emissions of volatile organic compounds which have been absorbed by the glycol during contact with the natural gas stream are controlled, while minimizing production of contaminants in the produced water stream. Pursuant to such disclosure, the vented steam and gaseous volatile organics (VOCs) from the glycol regenerator, are flowed as input to the bottom of a steam stripper column. The vapors exiting from the top of the steam stripper column are flowed to a cooling condenser to produce a condenser water stream having a relatively high content of the organic compounds. The condenser water stream is passed to the top of the steam stripper and then through the stripper in countercurrent relation to the gaseous VOCs and steam, in consequence of which the condenser water stream is stripped by the steam of substantial parts of its organics content, and emerges from the bottom of the stripper or column as a stripped water stream having relatively low content of the said organics. The stripped water stream may thereafter be passed to a water polishing stage whereat the organic content is further reduced to produce a polished water stream. Such further stage can take the form of an activated carbon adsorption system, an air stripper, or a polishing steam stripper. At least a portion of the polished water from these polishing systems can be utilized as coolant for the condenser where the latter includes a water-cooled stage or is generally of the water-cooled type. The vapors from the steam stripper are condensed into a condenser water stream, an organic vent gas, and an organic liquid. The vent gas may be used as a heating source for the glycol regenerator. In a further aspect of the prior invention, some of the energy content of the flash gas (see FIG. 1) may be used to compress the vent gas to render the latter more suitable for use as fuel at the regenerator and/or for flaring to atmosphere. Preferably the flash gas drives a jet compressor, whereby the combined flash and vent gases may be used for the aforementioned purposes.

While the aforementioned system is outstandingly effective for its intended purposes, it has been found in some instances that the steam stripper portion of the system introduces unnecessarily high costs and complexity. Accordingly, simplifications in such system have been sought which can yet achieve fully acceptable reductions in VOC emissions, and reduced contamination in the produced water streams.

SUMMARY OF THE INVENTION

Unexpectedly, it has now been found that the BTEX steam stripper portion of the Ser. No. 825,540 system may be omitted along with certain other modifications, and that the resulting system is yet extremely effective in providing an output water stream of very low organics content and in otherwise reducing VOC emissions. The simplified system of the invention in part relies on a cooling tower to air strip organics from the condenser water stream generated by cooling the steam and organic vapor discharges from the glycol regenerator.

Pursuant to the invention, the vented steam and gasified volatile organics from the glycol regenerator are flowed as input to a cooling condenser means including in series an air-cooled condenser and a downstream water-cooled condenser. The input vapors are condensed at the condenser means into a condenser water stream having a relatively high content of dissolved organic compounds, an organic vent gas, and an organic liquid. These phases are separated at an accumulator. The condenser water stream is provided to a cooling tower, sometimes in admix with recycle cooling water, and passed through the tower in counter-current or cross current relation to stripping air, whereby the condenser water stream is stripped of substantial parts of its volatile organics content and emerges from the cooling tower as a stripped water stream having relatively low content of said organics. At least part of the stripped water stream is used to cool the water-cooled condenser.

In a preferred procedure, the condenser water stream is passed to the top of a counter-current flow cooling tower and allowed to descend in counter-current relation to the stripping air, whereby the stripped water stream emerges from the bottom of the cooling tower. Although not as preferred as the counter-current cooling tower, a crossflow cooling tower can also be utilized in practice of the present invention.

One of the advantages of the invention derives from the fact that the system produces its own water for use as a coolant at the water-cooled condenser. This is a particularly valuable feature enabling effective use of the system at remote locations where other sources of cooling water are very scarce or even unavailable.

BRIEF DESCRIPTION OF THE DRAWINGS

The invention is diagrammatically illustrated by way of example, in the drawings appended hereto, in which.

DESCRIPTION OF PREFERRED EMBODIMENT

Figure 3:
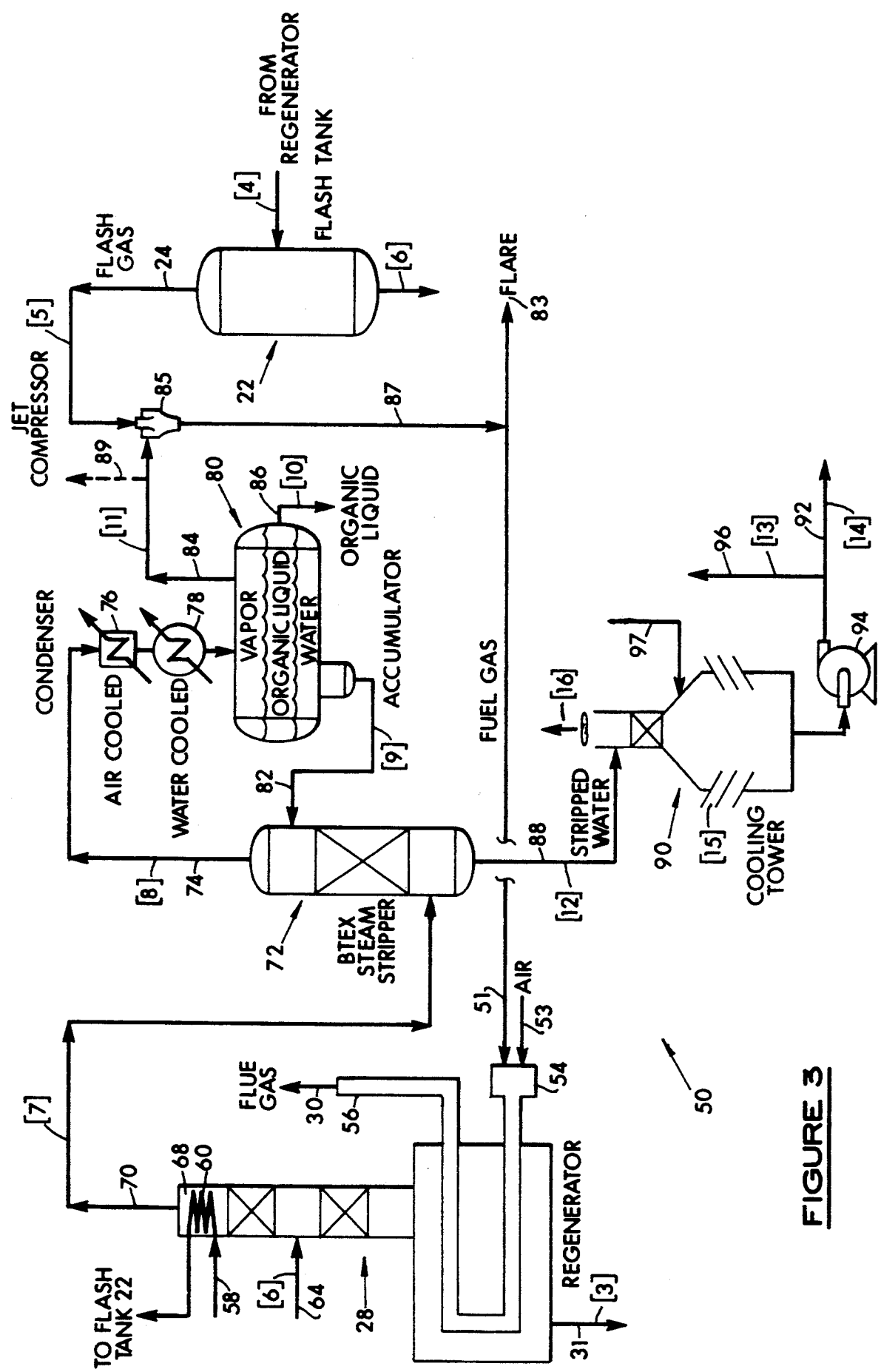
FIG. 3 is a schematic flow diagram illustrating a system in accordance with my Ser. No. 825,540 application, for regenerating glycol used to dry a gas stream, while at the same time producing a water stream which is significantly lower in its concentration of BTEX and other undesired organic species. Portions of the FIGS. 1 and 2 showings are incorporated by reference.

In FIG. 3 herein a schematic flow diagram appears illustrating a system 50 in accordance with my aforementioned copending application. A generally conventional glycol regenerator 28 is provided, which is heated with fuel gas 51 and air 53 provided to the fuel input 54. Flue gas 30 from this heating section is discharged at output 56. The moist input glycol, which is preferably triethylene glycol, proceeds initially from absorber 12 (FIG. 1) via line 58. Some heat exchange to reflux a small amount of water is required in the glycol knock-back section 68. One means of providing this reflux is by heat exchange with the incoming moist glycol. The moist glycol can therefore be initially passed through a heat exchanger 60 at the top of the regenerator 28 and thence to flash tank 22 and heat exchanger 26 (FIG. 1) which preheats the glycol to a temperature of about 114° F. Other media, e.g. air, could be used to provide heat exchange in the glycol knock-back section 68. The preheated moist glycol then passes to the center part of the regenerator column via the input line 64 (see FIG. 1). After passing downwardly through the regenerator and being appropriately heated, the regenerated glycol is discharged at line 31 and recycled for use in drying the initial gas stream as described in FIG. 1. The gas stream being treated typically comprises a natural gas, but obviously the glycol can be used to dry other gas streams of interest as is known in the art.

Vapors from the middle section of the glycol regenerator 28, which consist mostly of steam, are sent to glycol knock-back section 68. Here the triethylene glycol contained in the steam is condensed and returned to the regenerator bottom. Gases are taken from the top of the glycol knock-back section via line 70 and sent to the bottom of a steam stripper 72, where the steam strips BTEX and other VOCs from the liquid water that is added to the top of steam stripper 72 via line 82. The vapors exiting from the top of steam stripper 72 via line 74 proceed to an air and/or water cooled condenser. Specifically in the embodiment shown, the vapors are first provided to an air-cooled condenser 76. Other media, e.g. moist glycol, could also provide heat exchange in condenser 76. After passing through condenser 76, they are provided to water-cooled condenser 78. From water-cooled condenser 78, the partially condensed vapors go to accumulator 80. Accumulator 80 provides three separate outputs, namely a condensed water stream at 82, vent gas at 84, and condensed organic liquids at 86. Accumulator 80 produces a water product 82, which in a typical operation of drying natural gas contains approximately 1400 ppm organic compounds along with marketable organic liquids 86 which consist mostly of BTEX, and an off-gas product 84 consisting mostly of lighter paraffins and BTEX. The condensed water 82 is then returned to steam stripper 72 where steam from the regenerator 28 strips out most of the VOCs and BTEX. The stripped product water 88 therefore exiting from the bottom of steam stripper 72, can typically contain about 100 ppm BTEX and 75 ppm aliphatic hydrocarbons. The stripped water stream 88 can be subjected to additional treatment in a polishing stage to further lower its content of organics. In FIG. 3 such water 88 is seen to be provided to a polishing air stripper and cooling tower 90. Alternative devices which can be substituted for such instrumentality are a granulated activated carbon adsorption treatment system or a polishing steam stripper. The input stripped water 88 typically containing about 100 ppm BTEX and 75 ppm aliphatic or 28% of the BTEX and 7% of the aliphatic hydrocarbons originally present in the water can be thereby further improved, with the remaining BTEX being removed, thereby producing water of usable quality with extremely low concentrations of BTEX and VOCs. The final polished water 92 is provided via the pump 94.

Most of the BTEX and condensable VOCs in the stripper overhead will exit accumulator 80 either in the gas phase 84 or as a condensed organic BTEX liquid at 86. The split between vapor and liquid is a function of the temperature. For example, at 160° F. about 42% of the $C_{3+}$ leaves with gas 84; at 90° F. only 21% of the $C_{3+}$ exits with gas 84. In order to enable maximum recovery of the condensable organics as liquid, the temperature achieved in water cooled condenser 78 should be as low as possible. The relatively pure water from cooling tower 90 may be used as input cooling water 96 for the water cooled condenser 78, i.e. this water is provided as coolant to condenser 78, the return stream from which is shown at 97. This enables condenser 78 to reach a temperature of 90° F. or lower in the summer which further improves BTEX and VOC recovery efficiency. BTEX and VOC removal from the condensed water is essentially unaffected by condenser temperature.

The flue gas 56 from the glycol regenerator heater may be utilized as a source of heat where the polishing stripper 90 takes the form of a steam stripper as above discussed. In such an instance, steam from the polishing steam stripper may be sent to the BTEX steam stripper condensers 76, 78 where the BTEX can be recovered. As shown in FIG. 3, air stripping may be combined with a cooling tower to provide the cooling water 96 for condenser 78.

While it is possible to release vent gas 84 to atmosphere (as at 89), the vent gas 84 from accumulator 80 can be used as a fuel gas for the glycol regenerator heater, i.e. this fuel gas can be provided to input 54. In this manner, a dual function is satisfied, i.e. heat for the regenerator is usefully recovered, while at the same time the organics contained in the vent gas 84 are destroyed. It is also desirable to be able to flare the said vent gas to atmosphere. For the purposes indicated, it is desirable to raise the pressure of the vent gas above atmosphere, preferably to about 3 to 10 psig.

This pressurization may be effected by means of a jet compressor 85. The flash gas 24 from flash tank 22, which was discussed in connection with FIG. 1 constitutes principally light hydrocarbons is used as the motive gas for compressor 85. The mixed flammable gases in line 87, at about 3 to 5 psig may then safely and effectively serve as the fuel gas 51 which is combined with air 53 to provide a heat source for regenerator 28. Similarly the slightly compressed gases may be safely and effectively flared at 83.

Figure 1:
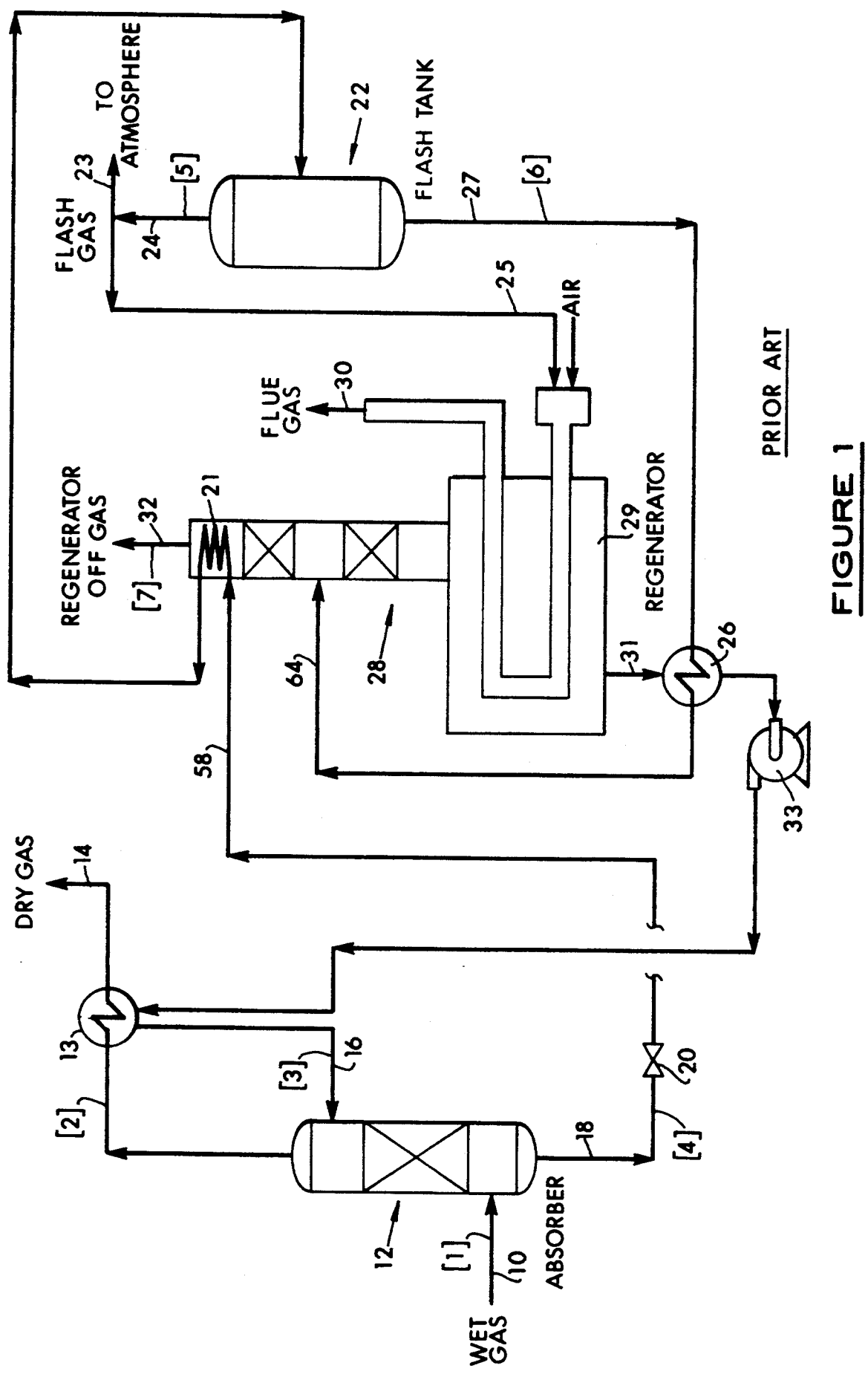
FIG. 1 is a prior art schematic illustration of an uncontrolled system used in the course of regenerating a glycol used for drying a gas stream.
Figure 2:
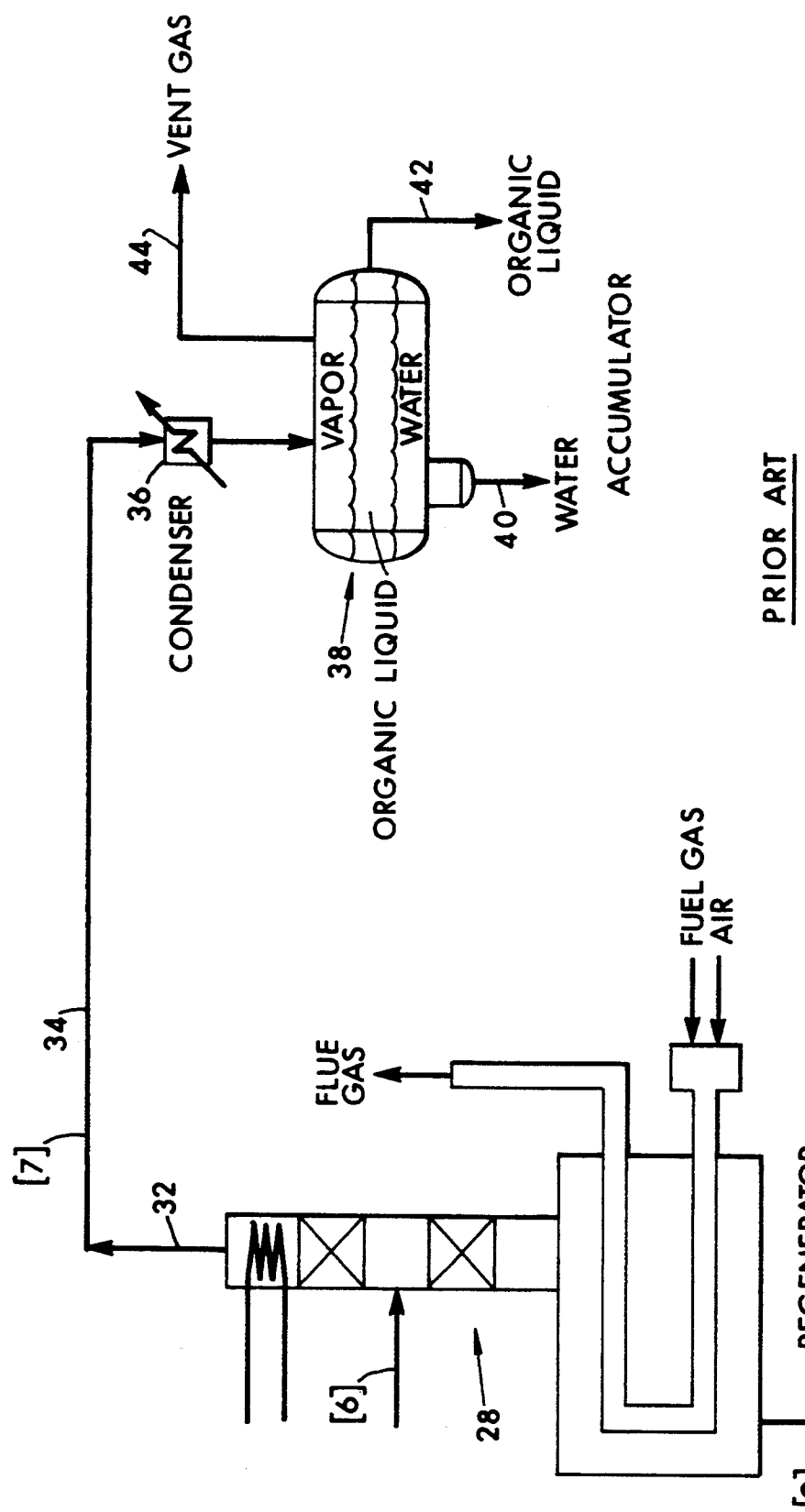
FIG. 2 is a further prior art showing, depicting a conventional condensation control system which can be used with the FIG. 1 apparatus.

Use of the jet compressor 85 for the purposes of compressing the vent gas 84 from accumulator 80 is also applicable to the otherwise prior art system of FIG. 2 (i.e. the system of FIG. 1 which includes the condenser and accumulator of FIG. 2). Again in this context the flash gas 24 may be used (as in FIG. 3) to compress the said vent gas for the same advantages as described in connection with FIG. 3.

The effectiveness of the foregoing system is further illustrated in the data of Table I which sets forth component material balance for a system 50 in accordance with FIG. 3 which is used to treat a 35 MMSCFD gas which includes the components indicated. The numerals at the head of each column correspond to the same bracketed numerals appearing in FIGS. 1, 2 and 3 in which they identify the sampled points in system 50. The concentrations of organics in the water streams are given in Table II. The effectiveness of the system in reducing BTEX and aliphatic compounds in the stripped water will be particularly evident by comparing the reflux water to packed column bottoms [12] and the blowdown cool water [14].

TABLE I

| | | Basis: 35 MM SCFD Wet Gas 55 gph Lean Glycol | | | | | | | |
|---|---|---|---|---|---|---|---|---|---|
| Comp, # mols/hr | MW | 1 Wet Gas | 2 Dry Gas | 3 Lean TEG | 4 Rich TEG | 5 Flash Bas | 6 Flash Liq | 7 Regen Offgas | 8 Column Overhead |
| Water | 18.0 | 2.2783 | 0.2035 | 0.282 | 2.3567 | 0.0047 | 2.3520 | 2.0705 | 1.8193 |
| TEG | 150.2 | 0.0000 | 0.0005 | 3.328 | 3.3279 | 6.99E-07 | 3.32790 | 0.0 | 0.0 |
| Methane | 16.0 | 3502.790 | 3502.723 | 0.0 | 0.6327 | 0.6289 | 0.0038 | 0.0038 | 0.0038 |
| Ethane | 30.0 | 224.690 | 224.471 | 0.0 | 0.2550 | 0.1738 | 0.0813 | 0.0813 | 0.0817 |
| Propane | 44.0 | 56.650 | 56.571 | 0.0 | 0.0876 | 0.0536 | 0.034 | 0.034 | 0.0342 |
| n-Butane | 58.0 | 14.188 | 14.155 | 0.0 | 0.0343 | 0.0158 | 0.0185 | 0.0185 | 0.0186 |
| Isobutane | 58.0 | 19.508 | 19.475 | 0.0 | 0.0356 | 0.0190 | 0.0166 | 0.0166 | 0.0166 |
| n-Pentane | 72.0 | 5.012 | 4.993 | 0.0 | 0.0198 | 0.0061 | 0.0137 | 0.0137 | 0.0138 |
| Isopentane | 72.0 | 9.715 | 9.687 | 0.0 | 0.0303 | 0.0110 | 0.0194 | 0.0194 | 0.0194 |
| Hexane+ | 84.0 | 22.746 | 22.600 | 0.0 | 0.1498 | 0.0279 | 0.1219 | 0.1219 | 0.1220 |
| Benzene | 78.0 | 0.965 | 0.926 | 1.66E-05 | 0.0395 | 0.0017 | 0.0377 | 0.0377 | 0.0378 |
| Toluene | 92.0 | 0.579 | 0.540 | 9.92E-06 | 0.0397 | 0.0009 | 0.0388 | 0.0388 | 0.0388 |
| Ethylbenzene | 106.0 | 0.193 | 0.165 | 7.57E-06 | 0.0278 | 0.0003 | 0.0276 | 0.0276 | 0.0276 |
| Xylene | 106.0 | 0.386 | 0.345 | 5.62E-06 | 0.0414 | 0.0005 | 0.0409 | 0.0409 | 0.0409 |
| N2 | 28.0 | NA | NA | NA | NA | NA | NA | NA | NA |
| TOTAL | | 3,860 | 3,857 | 3.61 | 7.08 | 0.94 | 6.13 | 2.52 | 2.27 |
| Temp, deg F. | | | 78.0 | 79.1 | 130.0 | 78.5 | 114.0 | 114.0 | 204.6 | 201.9 |

TABLE I-continued

| | | | | | | | | |
|---|---|---|---|---|---|---|---|---|
| Press, psia | 1029.7 | 1029.7 | 1029.7 | 1029.7 | 70.0 | 70.0 | 15.3 | 15.0 |
| Avg MW | 18.3 | 18.3 | 139.9 | 84.6 | 25.1 | 93.7 | 27.7 | 28.8 |
| # mol/ft3 | 0.212 | 0.212 | 0.491 | 0.598 | 0.012 | 0.708 | 0.002 | 0.002 |
| #/ft3 | 3.89 | 3.89 | 68.70 | 50.59 | 0.29 | 66.38 | 0.058 | 0.061 |
| #/hr | 70.662 | 70.577 | 504.9 | 598.7 | 23.7 | 574.8 | 70.1 | 65.6 |
| gpm (liquid) | — | — | 0.92 | 1.11 | — | 1.08 | — | — |
| acfm (vapor) | 302.9 | 302.6 | — | 0.05 | 1.4 | — | 20.0 | 18.1 |

Basis: 35 MM SCFD Wet Gas 55 gph Lean Glycol

| Comp, # mols/hr | MW | 9 Reflux Water | 10 Organic Product | 11 Condenser Vent Gas | 12 Packed Column Bottoms | 13 (a) Recirc Cool Water | 14 Blowdown Cool Water | 15 Stripping Air | 16 (b) CTower Vent Gas |
|---|---|---|---|---|---|---|---|---|---|
| Water | 18.0 | 1.8116 | 0.0004 | 0.0073 | 2.0628 | 29.21 | 0.3392 | 1.323 | 3.0242 |
| TEG | 150.2 | 0.0 | 0.0 | 0.0 | 0.0 | 0.0 | 0.0 | 0.0 | 0.0 |
| Methane | 16.0 | 9.33E-07 | 1.58E-07 | 0.0038 | 4.72E-08 | 0.0 | 0.0 | 0.0 | 4.72E-08 |
| Ethane | 30.0 | 4.47E-04 | 0.0054 | 0.0758 | 3.48E-05 | 0.0 | 0.0 | 0.0 | 3.48E-05 |
| Propane | 44.0 | 1.34E-04 | 0.0053 | 0.0287 | 7.65E-06 | 0.0 | 0.0 | 0.0 | 7.65E-06 |
| n-Butane | 58.0 | 5.22E-05 | 0.0067 | 0.0118 | 2.78E-06 | 0.0 | 0.0 | 0.0 | 2.78E-06 |
| Isobutane | 58.0 | 3.73E-05 | 0.0048 | 0.0117 | 2.04E-06 | 0.0 | 0.0 | 0.0 | 2.04E-06 |
| n-Pentane | 72.0 | 2.11E-05 | 0.0089 | 0.0048 | 1.55E-06 | 0.0 | 0.0 | 0.0 | 1.55E-06 |
| Isopentane | 72.0 | 2.66E-05 | 0.0112 | 0.0081 | 1.82E-06 | 0.0 | 0.0 | 0.0 | 1.82E-06 |
| Hexane + | 84.0 | 7.56E-05 | 0.041 | 0.0178 | 1.06E-05 | 0.0 | 0.0 | 0.0 | 1.06E-05 |
| Benzene | 78.0 | 1.02E-04 | 0.0341 | 0.0035 | 1.66E-05 | 0.0 | 0.0 | 0.0 | 1.66E-05 |
| Toluene | 92.0 | 2.52E-05 | 0.0375 | 0.0020 | 9.92E-06 | 0.0 | 0.0 | 0.0 | 9.92E-06 |
| Ethylbenzene | 106.0 | 6.17E-06 | 0.0273 | 2.23E-04 | 7.58E-06 | 0.0 | 0.0 | 0.0 | 7.58E-06 |
| Xylene | 106.0 | 5.46E-06 | 0.0404 | 4.58E-04 | 5.62E-06 | 0.0 | 0.0 | 0.0 | 5.62E-06 |
| N2 | 28.0 | NA | NA | NA | NA | NA | NA | 58.677 | 58.677 |
| TOTAL | | 1.81 | 0.22 | 0.18 | 2.06 | 29.21 | 0.34 | 60.00 | 61.70 |
| Temp, deg F | | 85.0 | 85.0 | 85.0 | 203.9 | 75.9 | 75.9 | 95.0 | 93.2 |
| Press, psia | | 14.7 | 14.7 | 14.7 | 15.33 | 14.7 | 14.7 | 14.7 | 14.7 |
| Avg MW | | 18.0 | 86.7 | 45.9 | 18.0 | 18.0 | 18.0 | 27.8 | 27.5 |
| # mol/ft3 | | 3.421 | 0.533 | 0.003 | 3.194 | 3.426 | 3.426 | 0.002 | 0.002 |
| #/ft3 | | 61.69 | 46.19 | 0.11 | 57.55 | 61.72 | 61.72 | 0.07 | 0.07 |
| #/hr | | 32.7 | 19.3 | 8.1 | 37.2 | 526.2 | 6.1 | 1667.6 | 1696.8 |
| gpm (liquid) | | 0.07 | 0.05 | — | 0.08 | 1.06 | 0.01 | — | — |
| acfm (vapor) | | — | — | 1.2 | — | — | — | 416.7 | 428.5 |

(a) Return Cooling Water Temp:; 120.0 deg F.
(b) BTEX Emissions: 0.09 lbs/day

TABLE II

Basis: 35 MM SCFD Wet Gas, 55 gph Lean Glycol

| Comp, ppmw | MW | 9 Reflux Water | 12 Packed Column Bottoms | 13 Recirc Cool Water | 14 Blowdown Cool Water |
|---|---|---|---|---|---|
| Methane | 16.0 | 0 | 0 | <0.01 | <0.01 |
| Ethane | 30.0 | 411 | 28 | <0.01 | <0.01 |
| Propane | 44.0 | 180 | 9 | <0.01 | <0.01 |
| n-Butane | 58.0 | 93 | 4 | <0.01 | <0.01 |
| Isobutane | 58.0 | 66 | 3 | <0.01 | <0.01 |
| n-Pentane | 72.0 | 46 | 3 | <0.01 | <0.01 |
| Isopentane | 72.0 | 59 | 4 | <0.01 | <0.01 |
| Hexane + | 84.0 | 194 | 24 | <0.01 | <0.01 |
| Total Aliphatics | | 1,049 | 75 | <0.01 | <0.01 |
| Benzene | 78.0 | 244 | 35 | <0.01 | <0.01 |
| Toluene | 92.0 | 71 | 25 | <0.01 | <0.01 |
| Ethylbenzene | 106.0 | 20 | 22 | <0.01 | <0.01 |
| Xylenes | 106.0 | 18 | 16 | <0.01 | <0.01 |
| Total Aromatics | | 352 | 97 | <0.01 | <0.01 |
| Total Organics | | 1,401 | 172 | <0.01 | <0.01 |

Figure 4:
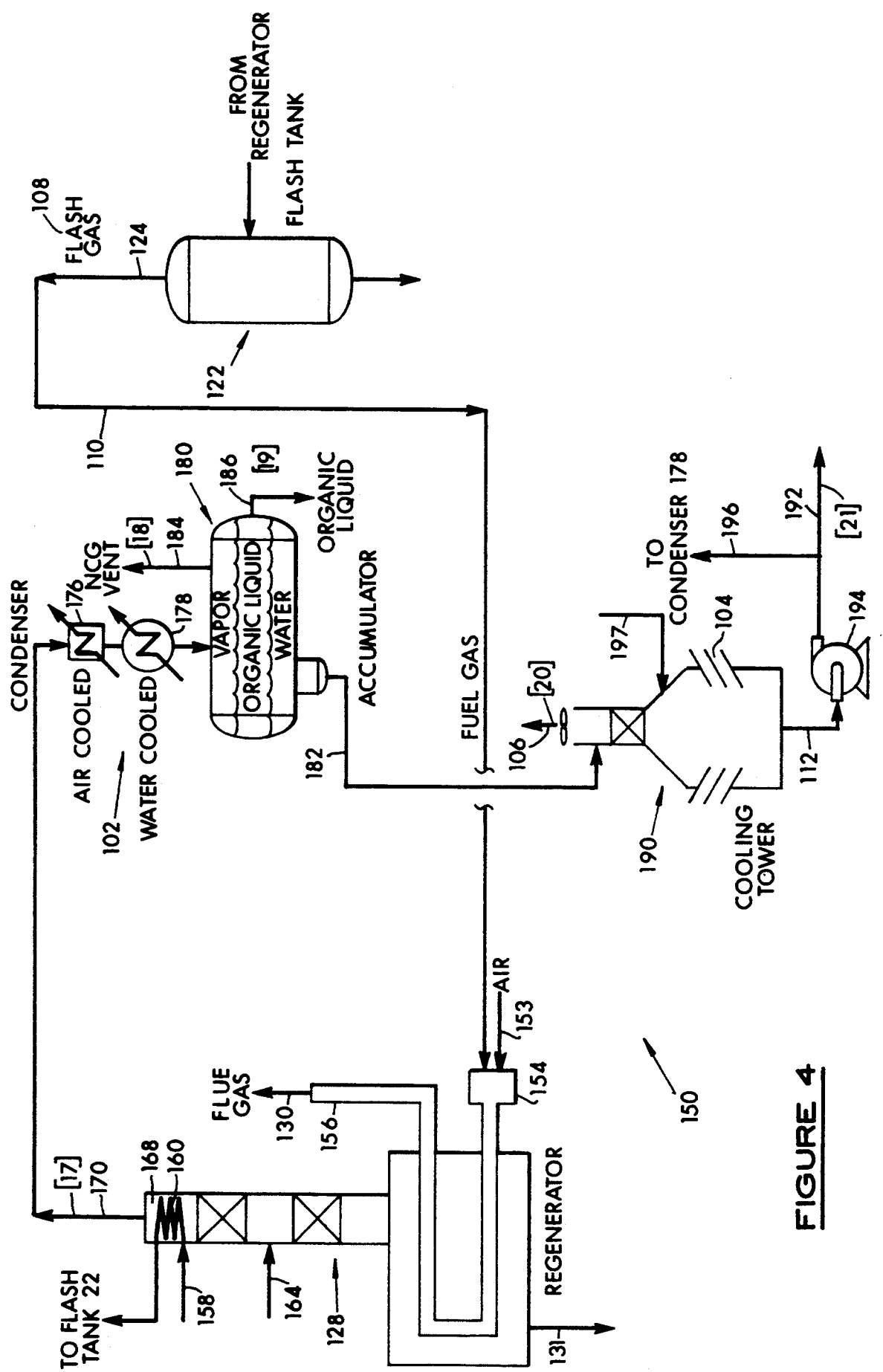
FIG. 4 is a schematic flow diagram illustrating a simplified system in accordance with the present invention, for generating glycol used to dry a gas stream, while producing a water stream which is significantly lowered in its concentrations of BTEX and other undesired volatile organic species.

In FIG. 4, a simplified system 150 in accordance with the present invention is schematically depicted. Certain portions of system 150 are substantially identical to corresponding elements in FIG. 3 and are correspondingly identified, except for being prefixed by a "1". Thus, glycol regenerator 128 corresponds to regenerator 28, and cooling-tower 190 corresponds to tower 90 in FIG. 3. Regenerator 128 is heated by flash gas 108 proceeding from flash tank 122 via line 124 to input 154 where it is combined with air 153. Other available fuel gases can be used in place of the flash gas. The operation of corresponding components is in accord with the description of FIG. 3. Whereas in the FIG. 3 system, gases from the top of the regenerator 28 are taken via line 70 to a steam stripper, in the present system 150, the steam stripper is eliminated, and such gases, including BTEX and other VOCs are provided directly to cooling condenser means 102, which comprises the in series air-cooled condenser 176 and water-cooled condenser 178. Water, liquid hydrocarbons, and noncondensable vapors from water-cooled condenser 178 proceed to three phase accumulator 180. Accumulator 180 functions as in FIG. 3, except that the non-condensable gases exiting at vent 184 are now discharged directly to atmosphere. These gases are low in VOCs. The condensed water stream 182 instead of being provided to a steam stripper is provided directly to the upper end of cooling tower 190 where it descends in counter current relationship to ascending stripping air entering the tower at 104.

Remarkably, the air stripping at tower 190 is found to be exceedingly effective in removing BTEX and VOCs present in water stream 182. The stripper air carrying small but acceptable quantities of BTEX and VOCs is vented at 106. This air stream can be directly discharged to atmosphere, or can first be used as a coolant for air cooled condenser 176. Part of the stripped water stream 112 from cooling tower 190 is pumped via pump 194 and line 196 back to water-cooled condenser 178 where it serves as a coolant. This is an important consideration in the present invention, in that the present system is seen to generate its own cooled and purified water for use in condenser 178. Particularly in remote field use when water is scarce or unavailable, this enables simple and effective operation of the system. Another portion of the relatively pure water stream 112 can be discharged at 192.

The effectiveness of system 150 can be appreciated from the data of Table III which sets forth material balances where the system 50 (FIG. 3) was used to treat a gas having components such that the stream proceeding in line 70 from the top of regenerator 28 had components as shown at the first column of the Table. The numerals at the head of each column correspond to the same bracketed numerals appearing in FIG. 3, in which they identify the sampled points in system 50. The concentrations of organics in the water stream for the condensed water and stripper bottoms of FIG. 3 are given in Table IV.

[0.05(758/340)]. This is an emission increase of only 0.06 TPY.

The material balance for the system 150 of FIG. 4 is calculated from the experimental data in Tables III and IV and is shown in Table V. The emission increase as a percent of the inlet VOCs is 0.15 percent. Emission control would drop from 98.72 to 98.57 percent. This decrease in "paper" control efficiency is reasonable on the basis of increased reliability of the equipment and decreased cost. The increased reliability results from the elimination of an entire unit operation, i.e., BTEX steam stripper 72 of FIG. 3. The possibilities for malfunction in the system of FIG. 4 are less than in the system of FIG. 3. As a result, the real emission control is probably the same or perhaps higher.

TABLE III

|  | Inlet Steam | Outlet Streams | | | | | | |
|---|---|---|---|---|---|---|---|---|
| Component Flows, lbs/hr | [7] Regen Overheads | [11] NCG Vent | [10] Condensate | [16] CT Vent | [14] CT Blowdown | Mass In | Mass Out | Closure |
| Water | 30.68 | NA | NA | 22.54 | 10.18 | 30.68 | 32.72 | 107% |
| Methane | 0.06 | 0.0751 | 0.00 | NA | 0.0000 | 0.06 | 0.08 | 125% |
| Ethane | 0.02 | 0.0336 | 0.00 | NA | 0.0000 | 0.02 | 0.03 | 151% |
| Other C3+ HCs | 2.08 | 0.0608 | 1.94 | 0.0008 | 0.0000 | 2.08 | 2.00 | 96% |
| Benzene | 4.82 | 0.0401 | 3.65 | 0.0061 | 0.0000 | 4.82 | 3.69 | 77% |
| Toluene | 3.25 | 0.0080 | 2.48 | 0.0032 | 0.0000 | 3.25 | 2.49 | 77% |
| Ethylbenzene | 0.21 | 0.0002 | 0.17 | 0.0001 | 0.0000 | 0.21 | 0.17 | 80% |
| Xylenes | 1.37 | 0.0008 | 1.08 | 0.0011 | 0.0000 | 1.37 | 1.08 | 79% |
| Total Flow | 42.49 | 0.22 | 9.32 | 22.55 | 10.18 | 42.49 | 42.26 | 99% |
| Total VOCs (a) | 11.73 | 0.1099 | 9.32 | 0.0113 | 0.00 | 11.73 | 9.44 | 80% |
| Total BTEX | 9.65 | 0.0491 | 7.38 | 0.0105 | 0.00 | 9.65 | 7.44 | 77% |
| Est Emissions w/o controls, TPY |  | 41.35 |  |  |  |  |  |  |
| NCG Vent VOC Emissions w/controls, TPY |  | 0.481 |  |  |  |  |  |  |
| CT Vent VOC Emissions w/controls, TPY |  | 0.049 |  |  |  |  |  |  |
| VOC Control Efficiency, % |  | 98.72 |  |  |  |  |  |  |

Notes:
(a) VOC is defined as all C3+ hydrocarbons
(b) NA = Not Available
(c) TPY = Tons per year VOC emissions from the system 50 are from two sources: the non-condensable gases (NCG) [11] vented at 84, and the cooling tower (CT) emissions vented at [16]. The system 50 data in Tables I and II were calculated with an ASPEN/SP simulator. Data in Tables III and IV are experimental data. It is surprising and unexpected that VOC reductions were so extensive. Emission control was 98.72%. The NCG emissions from vent 84 in the system constitute the major emission source. The emissions from the CT vent are minor. Air stripping at cooling tower 90 increases the CT vent emissions slightly, but not significantly compared to the NCG vent, stream 84. As may be seen from Table IV, the BTEX steam stripper lowers the total VOC (C3+hydrocarbons) level of the stripped water stream fed to the cooling tower from 759 to 340 ppm. This means that without the BTEX stripper, the CT vent emissions would increase from 0.05 to 0.11 tons per year

TABLE IV

| | Water Composition | |
|---|---|---|
| | ppm | |
| Component | Condenser [9] | Stripper Bottom [12] |
| $C_5$ | 0 | 0 |
| $C_6$ | 3 | 0 |
| Cyclo $C_6$ | 0 | 0 |
| $C_7$ | 0 | 0 |
| $C_8$ | 0 | 0 |
| $C_9$ | 0 | 0 |
| $C_{10}$ | 0 | 0 |
| Unidentified HCs | 86 | 28 |
| Benzene | 561 | 182 |
| Toluene | 96 | 94 |
| Ethylbenzene | 2 | 4 |
| Xylenes (o, m, & p) | 11 | 32 |
| Total VOCs | 759 | 340 |

TABLE V

| | Emissions from the System of FIG. IV | | | | |
|---|---|---|---|---|---|
| | Inlet Stream | Outlet Streams | | | |
| Component Flows, lbs/hr | [17] Regen Overheads | [18] NCG Vent | [19] Condensate | [20] CT Vent | [21] CT Blowdown |
| Water | 30.68 | NA | NA | 22.54 | 10.18 |
| Methane | 0.06 | 0.0751 | 0.00 | NA | 0.0000 |
| Ethane | 0.02 | 0.0336 | 0.00 | NA | 0.0000 |
| Other C3+ HCs | 2.08 | 0.0608 | 1.9383 | 0.0025 | 0.0000 |
| Benzene | 4.82 | 0.0401 | 3.6373 | 0.0188 | 0.0000 |
| Toluene | 3.25 | 0.0080 | 2.4799 | 0.0033 | 0.0000 |

TABLE V-continued

Emissions from the System of FIG. IV

| | Inlet Stream | Outlet Streams | | | |
|---|---|---|---|---|---|
| Component Flows, lbs/hr | [17] Regen Overheads | [18] NCG Vent | [19] Condensate | [20] CT Vent | [21] CT Blowdown |
| Ethylbenzene | 0.21 | 0.0002 | 0.1701 | 0.0000 | 0.0000 |
| Xylenes | 1.37 | 0.0008 | 1.0807 | 0.0004 | 0.0000 |
| Total Flow | 42.49 | 0.22 | 9.31 | 22.565 | 10.18 |
| Total VOCs (a) | 11.73 | 0.1099 | 9.31 | 1.0250 | 0.00 |
| Total BTEX | 9.65 | 0.0491 | 7.37 | 0.0225 | 0.00 |
| EST Emissions w/o Controls, TPY | 41.35 | | | | |
| NCG Vent w/controls of invention VOC Emissions, TPY | 0.481 | | | | |
| CT Vent w/controls of invention VOC Emissions, TPY | 0.110 | | | | |
| VOC Control Efficiency, % | 98.57 | | | | |

Notes:
(a) VOC is defined as all C3+ hydrocarbons
(b) NA = Not Available
(c) TPY = Tons per year While the present invention has been particularly described in terms of specific embodiments thereof, it will be understood in view of the present disclosure that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. In the method for extracting water from a gas stream containing quantities of water and of volatile organic compounds by contacting said gas stream with a glycol to absorb the water, and then regenerating the glycol for further use in said extracting by heating the moist glycol in a glycol regenerator to vaporize the water contained in same as steam and venting the steam and gasified volatile organics which have been absorbed by the glycol during contact with the gas stream; the improvement enabling control of emissions of said volatile organic compounds which have been absorbed by the glycol during contact with said gas stream, while minimizing contaminants in the produced water streams; comprising:

flowing the vented steam and gasified volatile organics from the glycol regenerator as input to a cooling condenser means including in series an air-cooled condenser and a downstream water-cooled condenser, said input being condensed at said condenser means into a condenser water stream having a relatively high content of said organic compounds, an organic vent gas, and an organic liquid;

passing said condenser water stream through a cooling tower in counter-current or cross-current relation to stripping air, whereby said condenser water stream is stripped of substantial parts of its organics content and emerges from the bottom of said cooling tower as a stripped water stream having relatively low content of said organics; and utilizing at least a part of the stripped water stream for cooling said water-cooled condenser.

2. A method in accordance with claim 1, wherein said cooling tower is a counter-current cooling tower, said water stream being provided to the top of said counter-current cooling tower and allowed to descend counter-current to said stripping air.

3. A method in accordance with claim 1, wherein the stripping air having passed in counter-current or cross-current relation to said condenser water stream is vented to atmosphere.

4. A method in accordance with claim 1, wherein the stripping air having passed in counter-current or cross-current relation to said condenser water stream is used to cool said air-cooled condenser.

5. A method in accordance with claim 1, wherein the moist glycol from contact with the said gas stream is passed through a flash tank before being passed to said regenerator for moisture extraction, said flash tank effecting separation of light hydrocarbons as flash gas; and wherein said flash gas is provided as a heating source to said glycol regenerator.

6. A method in accordance with claim 1, wherein said gas stream is a produced natural gas.

7. In a system for extracting water from a gas stream containing quantities of water and of volatile organic compounds, which system includes a glycol regenerator including a heating section for heating moist glycol provided thereto to thereby separate and vent the moisture from same as steam and gasified volatile organics which have been absorbed by the glycol during contact with the gas stream; means to provide the moist glycol having contacted the gas stream to said glycol regenerator for heating, and means for discharging the dried glycol from said regenerator and recycle same for further drying of said gas stream; the improvement enabling control of emissions of volatile organic compounds which have been absorbed by the glycol during contact with said gas stream and which are vented with said steam, while minimizing the organic contaminants in the water streams produced; comprising:

a cooling condenser means including in series an air-cooled condenser and a downstream water-cooled condenser;

means for flowing the vented steam and gaseous volatile organics from the glycol regenerator as an input to said cooling condenser means to produce a condenser water stream having a relatively high content of said organic compounds;

a cooling tower having means for establishing a flow of stripping air;

means for passing said condenser water stream as an input to said cooling tower, and thence through said tower in counter-current or cross-current relation to said stripping air, whereby said condenser water stream is stripped of substantial parts of its organics content and emerges from said cooling tower as a stripped water stream having relatively low content of said organics; and means for recirculating at least part of said stripped water stream as a coolant for said water-cooled condenser.

8. A system in accordance with claim 7, further including an accumulator for receiving the output from said water-cooled condenser, and splitting the output into water, organic liquid, and vent gas streams.

9. A system in accordance with claim 7, further including a flash tank connected to receive the moist glycol from contact with said gas stream before passing same to said regenerator for moisture extraction, and effect separation of light hydrocarbons as flash gas; said flash gas being provided to said regenerator for use as a heating fuel.

10. A system in accordance with claim 7, further including means for providing the stripping air emerging from said cooling tower as a coolant to said air-cooled condenser.

* * * * *